Jan. 28, 1930.   C. R. LIVERMON   1,744,906
PEANUT THRASHING MACHINE
Filed March 6, 1926   5 Sheets-Sheet 2

WITNESSES

INVENTOR
Carl R. Livermon
BY
ATTORNEYS

Patented Jan. 28, 1930

1,744,906

UNITED STATES PATENT OFFICE

CARL RABY LIVERMON, OF ROXOBEL, NORTH CAROLINA

PEANUT-THRASHING MACHINE

Application filed March 6, 1926. Serial No. 92,900.

This invention relates to improvements in peanut thrashing machines, and it consists of the constructions, combinations and arrangements herein described and claimed.

An object of the invention is to provide a thrashing machine for tearing or shredding the vines so that an initial loosening and separation of the peanuts is obtained, the material then passing through a moving screen where a rough separation of the peanuts from the vines is effected, both the separated peanuts and the chaff being subjected to a final airblast which blows all of the chaff away but permits the peanuts to drop back into a stemmer.

Other objects and advantages will appear in the following specification, reference being had to the accompanying drawings, in which

Figure 2 is a central longitudinal section thereof.

Figure 6 is a detail section taken substantially on the line 6—6 of Figure 1, the ratchet, dog and lever being shown in plan.

Figure 12 is a horizontal section of the peanut stemmer taken on the line 12—12 of Figure 2.

Figure 13 is a detail section on line 13—13 of Fig. 1.

Reference may be had to my prior patents for peanut thrashing machines 1,049,244 of December 31, 1912, 1,158,248 of October 26, 1915 and 1,164,370 of December 14, 1915 upon which patents the present invention is an improvement. In carrying out the invention provision is made of a wheeled frame 1 which is surmounted by a casing generally designated 2. The casing is closed at the sides and top but has a feed opening 3 at one end and a discharge opening 4 at the other end. A feed table 5 occupies a position in front of the opening 3.

Peanut vines thrown upon the table 5 are fed into the opening 3 where they are torn or shredded by the primary drum generally designated 6. This drum is composed of a plurality of slats 7 which are bolted or otherwise secured at the ends as at 8 (Figs. 2, 7 and 8), to the flanges 9 of the drum heads 10. Only one of the drum heads is shown but the reader will understand that there is one at each end of the drum 6. The drum heads are carried by a shaft 11 which is journaled at 12 in bearings upon the frame 1. The shaft 11 carries a sprocket 13.

Each slat 7 carries a plurality of spring fingers 14 (Fig. 8) which are arranged in staggered relationship. The description of one spring finger will suffice for all. The spring finger 14 is composed of a length of tempered resilient metal, bent in the middle to produce a U-base 15. It is then coiled at 16, and the coil terminates in finger ends 17. The coils provide for necessary yielding of the finger ends, but the mounting of the U-base also provides for certain lateral yielding of the spring finger 14 and therein lies an improvement.

The foregoing mounting comprises a washer 18 (Figs. 7 and 9), a cap plate 19 and a bolt 20 which secures the parts together, the U-base 15 being disposed between the washer and cap plate. In the instance of that spring finger 14 which comes over the flange 9 of the drum head 10, the bolt 20 may be passed through an opening in the flange, but in other instances where no head flange is present the bolt head will rest immediately beneath the slat 7. The cap plate 19 is recessed at 21 to receive the U-base. The recess is deeper than the U-base is thick thereby making the mounting of the spring tooth loose. The U-base is capable of limited bodily movement between the washer 18 and the cap plate 19 radially of the washer and plate and lengthwise of the slots in the concave. The purpose of this permissible movement is to throw the vibration of the teeth out of sympathy, thereby preventing crystallization of the metal and eventual breakage.

The coils 16 rest against the adjacent side of the slat 7 this arrangement preventing the teeth from getting out of normal position even though the clamp plates should work loose by virtue of the loosening of the clamp bolts due to the continued action of the teeth against the vines as they pass along. The various coils of the various spring teeth are thus disposed in spaces between adjacent slats 7. This is well shown in Figs. 2 and 7. The coils are thus out of the way, but the desired resiliency of the finger ends is not impaired. The yieldable mounting of the U-bases 15 gives the spring fingers additional opportunity to adjust themselves to particular conditions and thus avoid breakage.

In order to prevent the nut 22 from unscrewing the washer 23, placed between the plate 19 and nut 22, is bent up against one side of the nut and down into a recess 24 in the cap plate 19, thereby to constitute a lock. The lock washer is bent with any appropriate implement, for example a hammer. The engagement of the bent end with the nut and cap plate respectively prevent turning of the nut so that trouble with excessively loosening spring fingers will not be experienced.

The shredding action of the primary drum 6 requires the cooperation of stationary spring fingers 25. These are carried by slats 26 which extend across the outside of the primary concave 27. The primary concave has a plurality of elongated holes 28 through certain ones of which the spring finger ends extend so as to assume confronting positions in respect to the movable spring fingers 14 of the drum. The spring fingers 14 and 25 are identical in construction. The means for mounting the spring fingers 25 include a washer 29, cap plate 30, bolt 31 and nut 32 as in the case of the spring fingers 14. Details of the mounting means are not shown, but the principle is the same. However, the coils 33 of the spring fingers 25 are turned away from the cross slats 26, this being incidental to the facts that the spring fingers are identical with 14 and are mounted to extend inwardly instead of outwardly. A proper position of the spring fingers 25 in respect to the concave 27 is obtained by inserting a wedge strip 34 under one edge of the slats 26, thereby disposing the fingers 25 at a correct angle for proper cooperation of the drum fingers. It is important that the spring fingers 25 be mounted on top of the slats 26 thereby making each spring finger accessible for replacement and for tightening.

Figures 7, 8, 9, 10, 11:
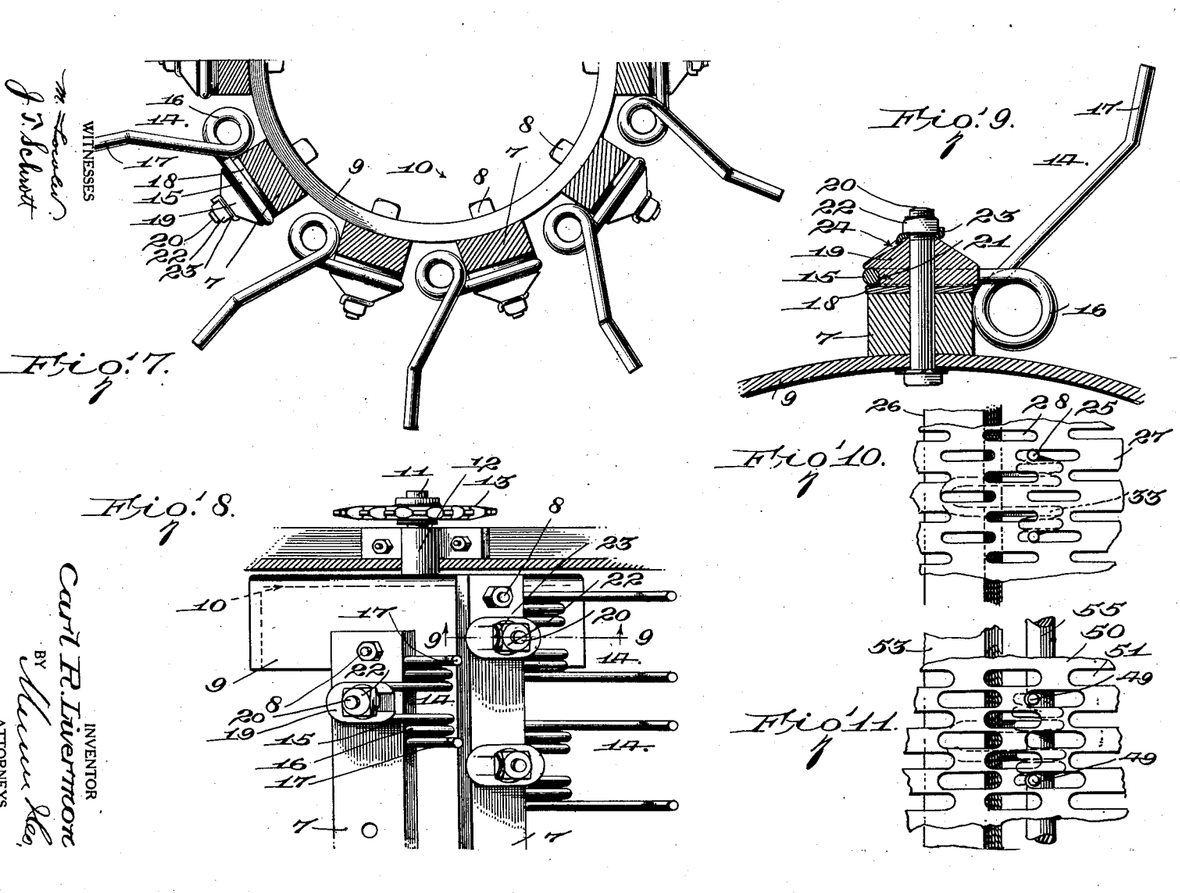
Figure 7 is a detail sectional view of the primary shedder drum.
Figure 8 is a detail plan view of a portion of the primary shedder drum, the adjacent casing being shown in section.
Figure 9 is a detail cross section taken substantially on the line 9—9 of Figure 8.
Figure 10 is a detail sectional view of a portion of the primary concave taken substantially on the line 10—10 of Figure 2.
Figure 11 is a detail sectional view of a portion of the secondary concave taken substantially on the line 11—11 of Figure 2.
Figure 15:
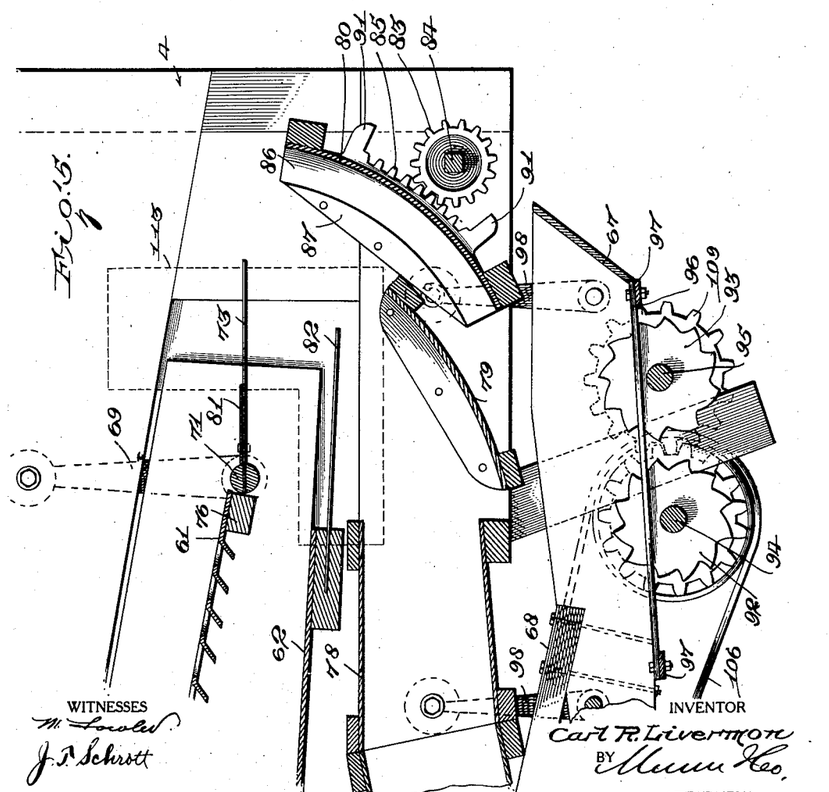
Figure 16:
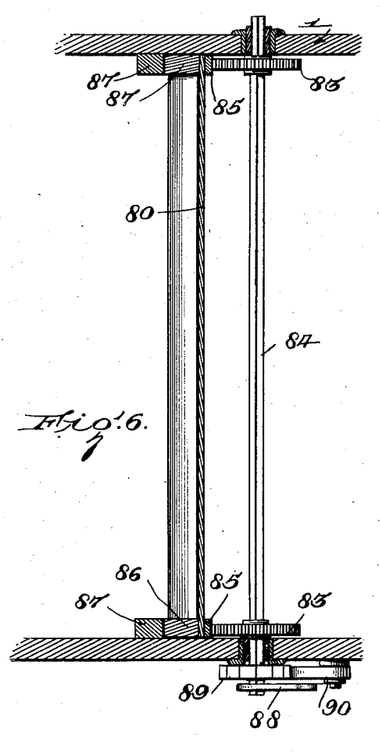

Mention has been made of the holes 28 being elongated. They are long and narrow as shown in Figure 10. The purpose in having them narrow is to prevent any loosened peanuts from dropping through to the ground, yet the holes permit loosened dirt to drop through. The spring fingers 25 project through certain ones of the holes into the interior of the primary concave and inasmuch as the holes are narrow side motion of the spring fingers is prevented. Limited movement of the fingers is permissible, both by virtue of the inherent resiliency of the spring fingers and by the limited movable mounting of the fingers upon the cross slats.

Figures 3, 4:
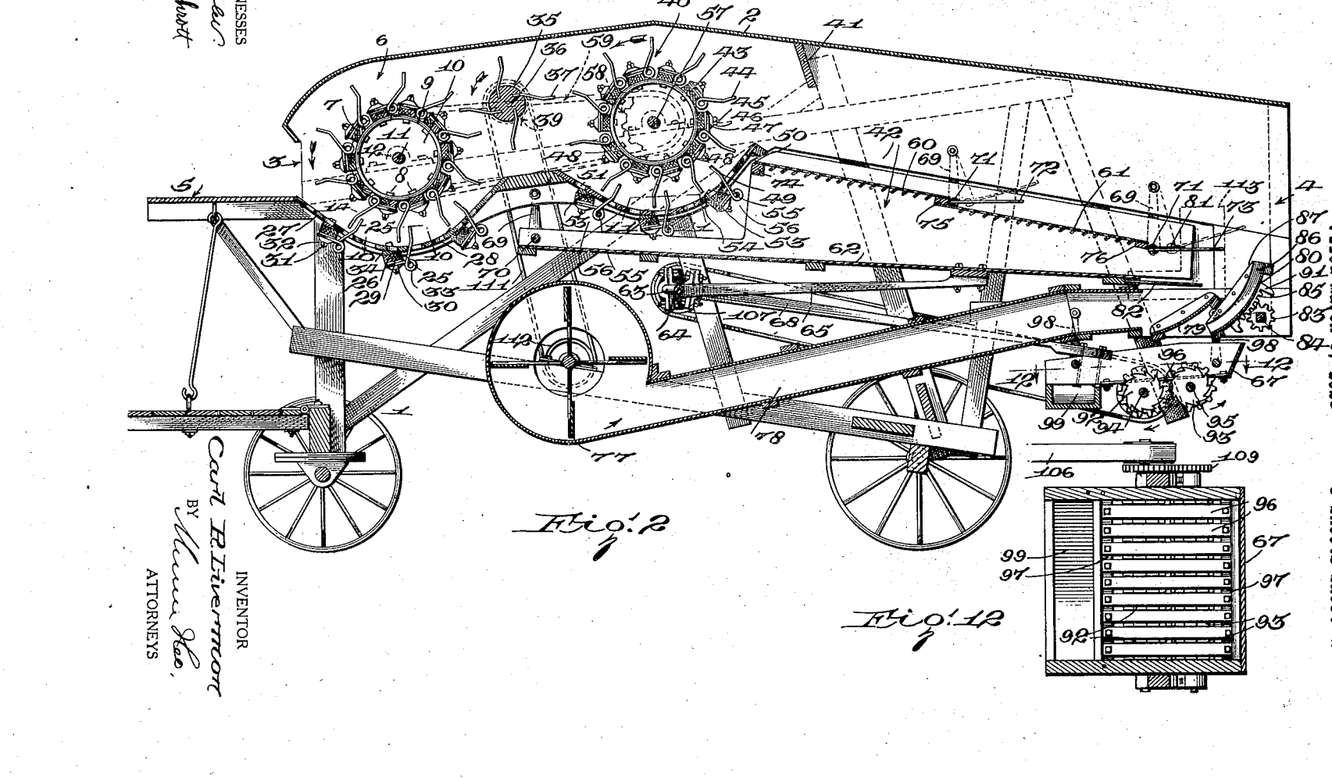
Figure 3 is a plan view of the machine.
Figure 4 is a detail plan view of the separator screen and a portion of the separator pan which is disposed beneath the screen.
Figure 3:
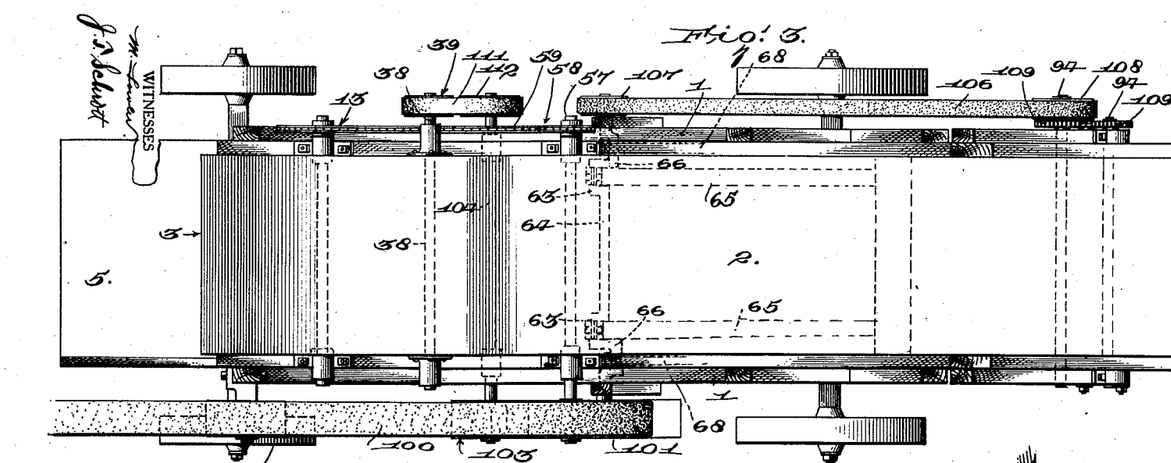
Figure 4:
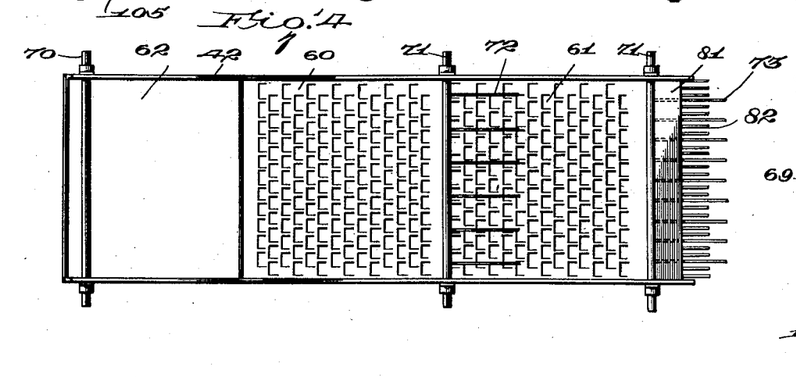

A stripper 35 clears the primary drum 6 of any hanging vines which cannot of themselves fly off due to insufficient centrifugal force. The primary drum revolves relatively slow but the stripper 35 revolves with considerable speed. It is composed of a hub 36 from which numerous prongs 37 project in such manner as to pass between the spaces of the spring fingers 14 for the purpose stated. The shaft 38 (Fig. 3) of the hub 36 carries a pulley 39.

After the initial tearing action of the primary drum 6 wherein the peanuts are torn off and after the clearing action of the stripper 35, the vines pass on to the secondary drum 40 by which the tearing or shredding action is completed. The vines are thrown off of this drum by centrifugal force, due to the relatively high speed of rotation, the material striking a baffle 41 which deflects it downwardly upon the separator apparatus generally designated 42. The secondary drum 40 is constructed identically with the primary drum 6, and to this end has a plurality of slats 43 upon which the spring fingers 44 are mounted. The mounting of each spring finger includes a bolt 45, nut 46, plate 47 and washer 48, and inasmuch as the mounting structure is identical with that of the spring fingers on the drum 6, reference may be had to Figures 8 and 9 which show the details more clearly.

The spring fingers 44 coact with relatively stationary spring fingers 49 of the secondary concave 50. This concave has elongated slots 51 through which the relatively stationary spring fingers project. The spring fingers are mounted upon cross slats 53 on the outside of the secondary concave in a manner identical with the mounting of the spring fingers 25 of the primary concave. The slats 53 have interposed wedges 54 which dispose the spring fingers in proper positions as already stated in connection with the spring fingers 25.

Inasmuch as the separating action commences at the secondary drum, the slots 51 are made sufficiently wide to let the peanuts pass through into the apparatus 42. The slots 51 are wider than the slots 28. But the spring fingers 49 are the same in size as the spring fingers 25. This circumstance leaves considerable room at the sides of the spring fingers and slots 51 (Fig. 11), but in order that the spring fingers may not be unduly displaced should an extra quantity of material pass between them and the drum fingers, round rods 55 (Figs. 2 and 11) are run through the coils and held in place by inserting cotter pins 56 in the ends of the rods. The rods may be known as stabilizing rods. The shaft 57 of the drum 40 carries a sprocket 58. A chain 59 connects the sprockets 13 and 58.

The separator apparatus 42, mentioned before, comprises the contiguous upper front and lower rear separator screens 60 and 61, and the pan 62. The shredded vines and peanuts thrown off of the secondary drum 40 by centrifugal force and deflected by the stationary baffle 41 fall upon the front and upper screen 60. Those of the peanuts and the chaff which fall through the slots 51 of the concave 50 are caught by the forward extension of the pan 62. The apparatus 42 is given a reciprocating motion in order to work the material to the rear of the machine.

Reciprocation of the separator apparatus is produced by the inner pair of cranks 63 (Fig. 3) of the shaft 64. Each crank has a pitman connection 65 with the bottom of the separator 42 (Fig. 2). The outer pair of cranks 66 (Fig. 3) of the shaft 64 reciprocates the stemmer trough 67 by means of pitman connections 68. The pitmen 65 and 68 are thin near the extremities where they attach to the pan 62 and stemmer 67 to permit flexing when operated by the cranks 63 and 66. Hangers 69 rockably support the apparatus 42 upon the framework of the machine. Rods 70 and 71 span the free ends of the hangers and support the separator apparatus by virtue of passing through the upright sides thereof. The upper pair of rods, distinguished by the numeral 71, have tines 72 and 73 fixed therein and projecting therefrom. The purpose of the pair of tines is to toss the material as it passes over the upper and lower screens 60 and 61 thereby to stir up the mass and again separate the peas and vines which tend to settle more or less compactly. Having this function the tines 72 and 73 constitute agitators.

It is observed that the upper screen 60 is fastened down upon cross battens 74 and 75, the latter coming substantially in the middle of the separator 42. The adjacent end of the lower screen 61 is fastened beneath the batten 75. This arrangement produces a recess in which the shaft 71 may be said to fit. In other words, the material passing from the upper screen 60 will fall upon the tines 72 in a natural manner, and the rod 71 being recessed or disposed so the top part thereof is substantially level with the top of the batten 75, offers no obstruction to the passage of the material. A similar arrangement follows in the case of the last cross batten 76 and the rod 71 by which the tines 73 are carried. The material is given a considerable lift when the tines 72 and 73 move from the full to the dotted line position (Fig. 2) as the separator 42 is reciprocated. The action of the agitators thus becomes automatic, and independent means for the operation of the agitators is not required.

Figure 5:
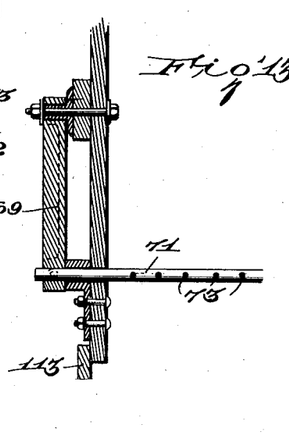
Figure 5 is a detail sectional view of the discharge end of the machine, particularly illustrating the adjustable wind board and its relationship to the end of the separator screen and pan.

A blower 77 drives a blast of air through the conduit 78 and delivers it across the screen and pan outlets of the separator apparatus 42 whence it passes to atmosphere through the discharge opening 4, carrying the chaff (shredded vines, etc.) with it. A stationary deflector 79 and adjustable wind board 80 properly directs the air blast in respect to the separator apparatus. A sheet metal or other apron 81, laid across the base of the tines 73 (see Figs. 2, 4 and 5) prevents the shredded vine ends and similar chaff from dropping between the tines at the base where the pressure of the airblast is least. In other words, the apron 81 serves the purpose of keeping the material, principally the vine ends, etc. upon the tines 73 until they work out to the extremity of the tines where the air blast or lift is effective.

A set of tines 82 at the delivery end of the pan 62 exposes the separated peanuts to the air blast so that most, if not all, of the chaff sifted through the screens 60 and 61 may be blown away before the peanuts drop into the stemmer trough 67. Most of the peanuts will drop upon the wind board 80, but some may drop upon the fixed deflector 79, but in either case the peanuts will fall into the stemmer. A pair of gears 83 on a shaft 84 (Figs. 2, 5 and 6) mesh with racks 85 on the bottom of the windboard 80.

Turning of the shaft adjusts the windboard 80 in reference to the delivery end of the separator apparatus 42. The adjustment occurs in a curvilinear direction. The end pieces 86, upon which the bottom of the windboard is secured, are curved. The racks 85 are curved. The sectors 87, fixed upon adjacent sides of the machine frame have curved portions upon which the sides 86 bear and move. It is clear that the windboard 80 is supported between the gears 83 and sectors 87, and it is equally clear that turning of the shaft 84 will move the windboard in the manner stated.

Adjustment of the windboard 80 will direct the airblast toward or away from the sets of tines 73 and 82. If the weight of the peanuts of a particular crop runs light the windboard is raised to increase the distance or height the peanuts have to be raised above the tines 82 before they reach the top of the windboard and are blown over. This presents a better opportunity of the peanuts to get into said chamber formed between the deflector 79 and the windboard 80. If the peanuts run heavy, the windboard is lowered so as to drive over such light trash and chaff as would follow light peanuts down into the stemmer.

Figure 1:
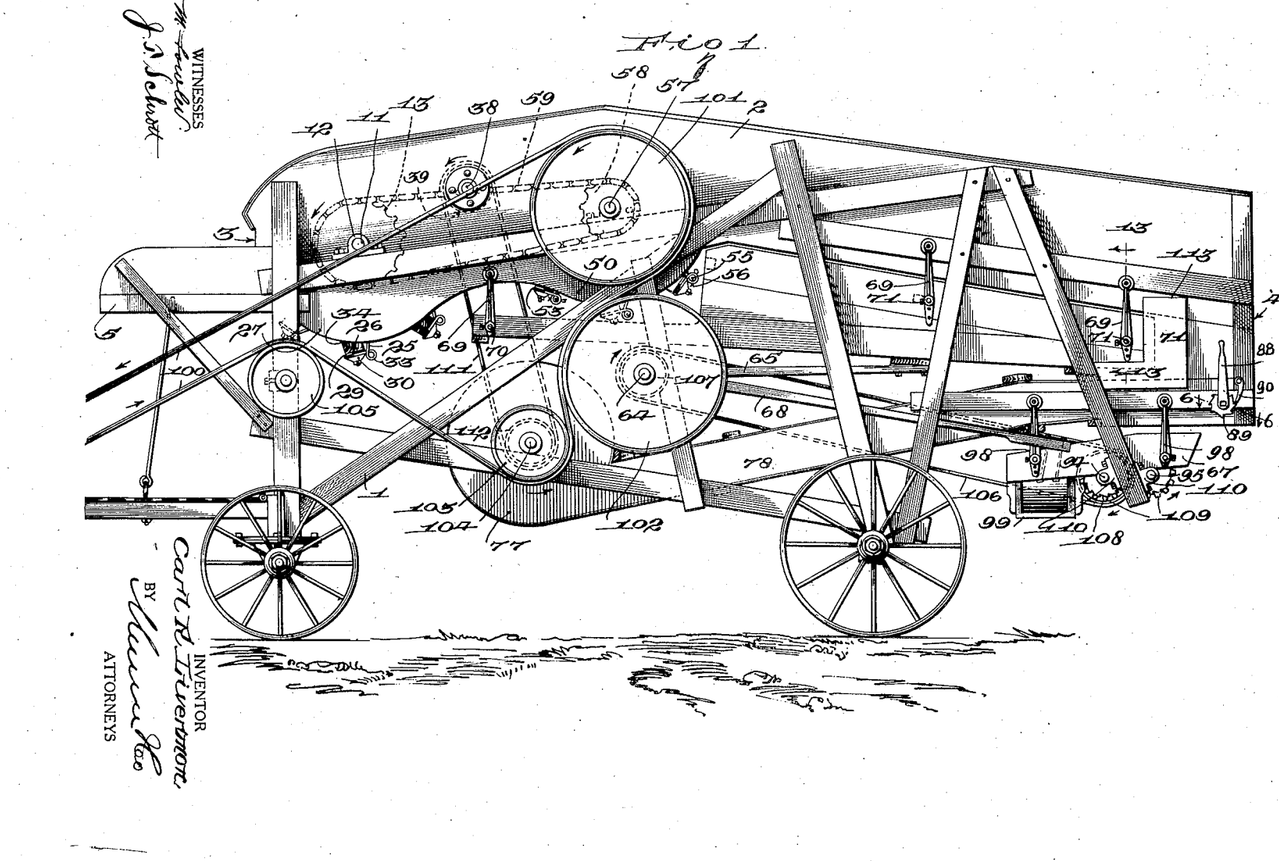
Figure 1 is a side elevation of the improved peanut thrashing machine.

A handle 88 on the outside of the machine (Fig. 1) permits turning the shaft 84 for the purposes mentioned. This handle is fixed on the protruding end of the shaft. The shaft is not circular as shown, but has bushings which run in bearings upon the frame. The end of the shaft adjacent to the handle 88 also carries a ratchet 89. A loosely pivoted dog 90 engages the ratchet to hold the windboard 80 in its adjusted position. The weight of the windboard tends to turn the shaft 84 in the counterclockwise direction, and the dog 90 will therefore remain in engagement with the ratchet 89 by friction. The dog 90 is simply knocked out when a downward adjustment of the windboard is to be made, and may be held in place by hand when an upward adjustment is made. The adjustments of the windboard are limited by lugs 91 at the extremities of the rack 85. These lugs will ultimately come into engagement with the gears 83 and thus prevent further adjustment in one or the other direction.

The peanut stemmer may be of any desired type, but for the purpose of the present description consists mainly of a plurality of saws 92 and 93 mounted upon shafts 94 and 95. The saws work in spaces between slats 96, the arrangement of the supports 97 of the slats being such as to leave sufficient room between the pairs of the saws and the supports so that the shaking or reciprocating motion of the stemmer trough 67 may not be interfered with. The stemmer trough is supported by hangers 98.

The action of the saws and the shaking motion of the trough 67 are such that the stems are rubbed off of the peanuts. The stems fall between the slats to the ground, but the peanuts are delivered to a chute 99 whence they flow into a suitable receptacle.

Driving means for the thrasher comprises the belt 100 (Fig. 1) which runs over pulleys 101 and 102 of the shafts 57 and 64 in such a manner as to drive these shafts in the counter-clockwise and clockwise directions respectively. Reference may be had to the arrows in Figures 1 and 2 for the directions of rotation of the various elements. The belt 100 also runs over a pulley 103 on the shaft 104 of the blower 77. After running over the idler 105 the belt passes on to the pulley 103.

A belt 106 applied to pulleys 107 and 108 on the crank and stemmer shafts 64 and 94 respectively, drives the latter. The shafts 94 and 95 are geared together as at 109 (Fig. 1) and the shafts mentioned are journaled at 110 (Fig. 1) upon the frame 1. A belt 111 applied to the pulley 39 on the stripper shaft 38 (Fig. 3) and to a pulley 112 on the blower shaft 104 drives the stripper 35 at a desirable high speed. Those portions of the casing 2 that are open adjacent to the delivery end of the separating apparatus 42 are provided with covers 113 (Fig. 5) which prevent peanuts and chaff from escaping at the sides.

The operation will be readily understood. The peanut vines are uprooted and thrown upon the feed table 5 whence they are crammed into the feed opening 3. The secondary drum 40 is driven at a sufficiently high rate of speed to throw off the material which is pretty well shredded by the time it reaches that drum. The primary drum 6 is driven from the shaft 57 of the secondary drum, but the driven sprocket 13 (Fig. 3) is larger than the driving sprocket 58 and therefore the rotating speed of the primary drum will be less than that of the secondary drum. The speed of the former is not sufficient to throw off the primarily torn vines by centrifugal force, and the stripper 35 therefore acts to clear the primary drum of any hanging vines as already stated.

Tearing of the vines in the first and second stages occurs by the coaction of the moving spring fingers 14 and 44 of the drums with the relatively stationary spring fingers 25 and 49 of the primary and secondary concaves 27 and 50. The slots 28 of the primary concave are too narrow for peanuts to drop through, but the dirt loosened from the vine roots will sift through to the ground. The slots 51 of the secondary concave are wider and will permit peanuts to drop through upon the forward extension of the separator pan 62.

Although some of the peanuts will fall through the slots 51 of the secondary concave upon the separator pan 62 they will also be accompanied by considerable portions of shredded vines, etc. The greater portion of the material will be thrown against the stationary baffle 41 by which such material is deflected down upon the upper screen 60. Incidentally, it may be stated that the upper and lower screens are composed of metal having downwardly bent lips (Fig. 4) through which the peanuts are intended to drop and over which the chaff will move.

Movement is imparted to the separator apparatus, of which the screens 60 and 61 and the pan 62 are a part, by the cranks 63 and pitman connections 65. The crank shaft 64 simultaneously moves the stemmer trough 67. The movement of the separator shakes the material both upon the screens and pan.

Each rocking motion of the hangers 68 at the top of the separator is accompanied by an upward toss of the material passing over the tines 72 and 73. These tines are fixed in the shafts 71 upon which the upper part of the separator is suspended, and enough motion of the tines is obtained to give the material a decided toss producing such agitation as will stir up the mass and again separate the peanuts and vines which have a tendency to pack together rather closely.

As the material works out upon the tines 73 and 82 at the delivery end of the screens and pan 62 respectively, it is subjected to the airblast coming from the conduit 78. The windboard 80 directs the blast upwardly, and the windboard is adjustable so that the blast can be adjusted in respect to the sets of tines thereby to compensate for different qualities of peanuts. It is natural that the airblast will be somewhat weaker toward the base of the tines 73 than at the extremities. An apron 81 insures that the peanuts and vine ends shall work out toward the extremity of the tines 73 thereby to be subjected to the full airblast and insure the blowing away of such ends, etc. The apron also insures an upward and outward pitch.

The more dense pads of material will work farther out to the ends of the tines 73 and therefore be given an even greater upward and outward pitch, permitting the air to blow such pads out of the machine rather than remain for a fraction of time until the condition arises of the airblast increasing in pressure by virtue of the exit becoming slightly choked. The function of the apron also prevents the machine from choking in case any of the drive belts slip or the engine slows down to a considerable extent, or perhaps stops entirely, with the machine in full operation.

While the construction and arrangement of the improved peanut thrasher is that of a generally preferred form, obviously modifications and changes may be made without departing from the spirit of the invention or the scope of the claims.

I claim:

1. A thrasher comprising a drum, a perforated concave therefor, spring fingers accessively mounted exteriorly on the periphery of the drum with their mounting exteriorly of the cylinder and wholly exposed, spring fingers accessibly mounted on the convex face of the concave with their mounting wholly exposed and with fingers extending through convenient perforations for coaction with the drum spring fingers, and means to rotate the drum.

2. A thrasher comprising a rotary drum, a perforated concave therefor, a plurality of slats being part of the drum, a plurality of spring fingers accessibly mounted upon each of the slats with their mounting wholly exteriorly thereof, a plurality of slats mounted on the convex face of the concave, and a plurality of spring fingers accessibly mounted upon the outer face of each of the slats with their mounting wholly on said outer face and with the free ends of the fingers extending through convenient perforations for coaction with the drum spring fingers.

3. A thrasher comprising a rotary drum, a perforated concave therefor, a plurality of slats being part of the drum, a plurality of spring fingers mounted upon each of the slats and radiating from the drum, a plurality of slats mounted on the outside of the concave, a plurality of spring fingers mounted upon each of the slats and extending through convenient perforations in opposition to and for coaction with said drum spring fingers, and wedges interposed between the concave and slats mounted thereupon disposing the respective spring fingers in proper relationship to the concave and to the drum spring fingers.

4. A thrasher comprising a drum having a plurality of relatively closely spaced parallel slats, a spring finger carried by each slat being bent to form a U-base which is superimposed upon the slats and spring coils which rest against the side of the respective slat, a washer upon which the U-base has bearing, a cap plate fitted upon the washer having a recess in which the U-base fits, said recess being deeper than the U-base is thick thereby providing a loose mounting for the spring finger; means to secure the washer and cap plate to the slat thereby holding the spring finger in position, said means including a bolt and nut, and means to lock the nut in position, said means including a washer which is bent up against one side of the nut and bent down into a recess in the cap plate.

5. A thrasher comprising a pair of drums successively operating upon material to be thrashed, spring fingers carried by each drum, a concave for each drum, coacting spring fingers carried by each concave opposing the spring fingers on the drums, means for rotating the drums with the first drum to act on the material rotating at a lower rate than the second drum, and means interposed between said drums for clearing the slow drum of material adhering thereto due to failure thereof to fly off by virtue of the low rate of rotation.

6. A thrasher comprising a pair of drums successively operating upon material to be thrashed, a plurality of spring fingers carried by each drum, a concave for each drum, spring fingers carried by the concave opposing the drum spring fingers, and coacting therewith for shredding material introduced into the thrasher, means for rotating the drums so that the first drum to act on the material rotates at a substantially slower speed than the second drum, a stripper cooperating with the first and relatively slow drum, and means for rotating the stripper at a relatively high rate of speed to clear said slow drum of material failing to fly off due to the low rate of speed.

7. A thrasher comprising a rotary drum, radial fingers carried by the drum, a concave having slots therein, fingers exteriorly carried by the concave opposing the drum fingers and extending through the slots of the concave to coact therewith, said slots being wider than the concave fingers are thick; means mounted upon the exterior of the concave provided with recesses to receive and loosely to hold said fingers for bodily movement in the direction of the slots additionally to that afforded by the resiliency of said fingers, and means including a rod extending from one to the other of and inter-connecting the concave fingers preventing lateral motion thereof upon the mounting means for said fingers.

8. A thrasher comprising a perforated concave, a slat disposed across the outside of the concave, spring teeth extending through certain perforations into the interior of the concave and having U-bases applied to the outside of the slat, clamp means for securing the U-bases including nuts which are accessible from the outside of the slat thereby permitting replacement and adjustment of any one spring finger without affecting the others, and a wedge interposed between the slat and concave placing the slat at an angle in respect to the concave and disposing the straight fingers in proper position inside of the concave.

9. A thrasher comprising a rotatable drum having spring fingers extending therefrom, a cooperating concave having slots therein, spring fingers carried exteriorly of the concave and extending through the slots therein to cooperate with the drum fingers, said concave fingers having spring coils and end loops exteriorly of the concave, and mounts for said end loops secured to the exterior of the concave, said mounts having recesses therein of greater depth than the thickness of the end loops to receive and loosely to retain the loops therein for bodily movement of said loops therein lengthwise of the slots responsive to impact against and vibration of the fingers.

10. A thrasher comprising a rotary drum having a plurality of slats extending in parallel circumferentially spaced relation about its periphery, a plurality of spring fingers carried by and extending from each slat, said fingers having end loops by which the fingers are mounted on the slats and intermediate coils engaging the edges of the slats, and mounts for said end loops including members having annular grooves therein of greater depth than the thickness of the metal of the loops in which grooves said loops are seated and retained, with the greater depth of said grooves permitting slight bodily movement of the loops in the annular grooves responsive to thrust against the spring fingers and in addition to the movements of said fingers due to the vibrations of resiliency.

11. A thrasher comprising a rotary drum, radial spring fingers carried by and outstanding from the drum, a concave cooperating with said drum having slots therein, spring fingers mounted exteriorly on the concave and extending through the slots therein for cooperating with the spring fingers of the drum in acting upon the material to be thrashed, said concave spring fingers having end anchoring loops and intermediate spring coils, and mounts for said end loops positioned on the exterior of said concave and including members having annular grooves therein of greater depth than the thickness of the metal of the loops in which grooves said loops are seated and retained with the greater depth of the grooves permitting slight bodily movement of the loops in the grooves responsive to thrust against the fingers and in addition to movements of the fingers due to vibrations of resiliency.

CARL RABY LIVERMON.